United States Patent
Aleksovski et al.

(10) Patent No.: US 10,737,126 B1
(45) Date of Patent: Aug. 11, 2020

(54) WOOD ANCHORING DEVICE

(71) Applicant: Climb Tech, LLC, Austin, TX (US)

(72) Inventors: Daniel Aleksovski, Irondale, AL (US); Ivan A. J. Kekahuna, Austin, TX (US); Glenn Hartop, Austin, TX (US)

(73) Assignee: Climb Tech, LLC, Austin, TX (US)

( * ) Notice: Subject to any disclaimer, the term of this patent is extended or adjusted under 35 U.S.C. 154(b) by 0 days.

(21) Appl. No.: 16/051,111

(22) Filed: Jul. 31, 2018

(51) Int. Cl.
  *A62B 35/00* (2006.01)
  *A62B 35/04* (2006.01)
  *E04G 21/32* (2006.01)
  *F16F 7/00* (2006.01)
  *F16F 7/12* (2006.01)

(52) U.S. Cl.
  CPC ...... *A62B 35/0068* (2013.01); *A62B 35/0043* (2013.01); *A62B 35/0056* (2013.01); *A62B 35/04* (2013.01); *E04G 21/328* (2013.01); *E04G 21/329* (2013.01); *E04G 21/3276* (2013.01); *F16F 7/003* (2013.01); *F16F 7/128* (2013.01)

(58) Field of Classification Search
  CPC . A62B 35/0068; A62B 35/04; A62B 35/0056; A62B 35/0043; F16F 7/128; F16F 7/003; E04G 21/3276; E04G 21/329; E04G 21/328; F16B 13/122
  See application file for complete search history.

(56) References Cited

U.S. PATENT DOCUMENTS

| | | | | |
|---|---|---|---|---|
| 5,248,021 A * | 9/1993 | Nichols | ........... | A62B 35/04 182/3 |
| 5,896,719 A * | 4/1999 | Thornton | ........... | A62B 35/0068 52/698 |
| 6,098,746 A * | 8/2000 | Castaneda | ........... | A62B 35/0043 182/45 |
| 6,668,509 B1 * | 12/2003 | Krebs | ........... | E04D 13/12 52/698 |
| 7,665,248 B2 * | 2/2010 | Blackford | ........... | E04D 13/12 52/27 |
| D646,553 S * | 10/2011 | Peng | ........... | D8/349 |
| 8,752,801 B2 * | 6/2014 | Parquette | ........... | E04G 3/26 182/45 |

(Continued)

FOREIGN PATENT DOCUMENTS

| CH | 704527 A1 * | 8/2012 | ........... E04G 21/329 |
|---|---|---|---|
| DE | 202011108340 U1 * | 2/2012 | ........... A62B 35/0068 |

(Continued)

*Primary Examiner* — Eret C McNichols
(74) *Attorney, Agent, or Firm* — Garth Janke

(57) ABSTRACT

A wood anchoring device having a connecting ring defining a closed connecting aperture and at least two ties, at least two of the at least two ties having respective fastening holes at anchoring ends thereof. The device may be fastened to the thin side of a 2×N piece of lumber through the fastening holes, wherein the at least two of the at least two ties are on the same side of the connecting ring relative to the axis of a test tensile load applied to the connecting ring in a direction perpendicular to the elongate axis of the piece of lumber. At least one of the ties has a length that is substantially different from a corresponding length of at least one other tie, the different lengths providing for responding to tensile loading by stretching differentially and thereby assisting in equalizing the forces applied to the fastening holes.

21 Claims, 13 Drawing Sheets

(56) References Cited

U.S. PATENT DOCUMENTS

| | | | | |
|---|---|---|---|---|
| 9,039,049 | B2* | 5/2015 | Lahey | F16M 13/02 |
| | | | | 292/264 |
| 9,227,094 | B2* | 1/2016 | Poldmaa | E04G 21/328 |
| 9,458,640 | B2* | 10/2016 | Small | E04G 21/3295 |
| 9,744,387 | B1* | 8/2017 | Hung | E04G 21/328 |
| 10,220,225 | B2* | 3/2019 | Gamba | A62B 35/0068 |
| 2004/0256176 | A1* | 12/2004 | Argoud | A62B 35/04 |
| | | | | 182/45 |
| 2006/0059844 | A1* | 3/2006 | Ely | E04G 21/3276 |
| | | | | 52/698 |
| 2007/0144830 | A1* | 6/2007 | Mastenbroek | E04G 21/329 |
| | | | | 182/3 |
| 2008/0271407 | A1* | 11/2008 | Snider | E04D 13/12 |
| | | | | 52/745.06 |
| 2008/0277557 | A1* | 11/2008 | Vetesnik | A62B 1/04 |
| | | | | 248/499 |
| 2012/0067667 | A1* | 3/2012 | Marcoux | A62B 35/0068 |
| | | | | 182/3 |
| 2012/0079786 | A1* | 4/2012 | O'Donnell | E04G 21/3285 |
| | | | | 52/698 |
| 2013/0168528 | A1* | 7/2013 | Patton | F16F 7/126 |
| | | | | 248/548 |
| 2013/0277519 | A1* | 10/2013 | Poldmaa | A62B 1/04 |
| | | | | 248/237 |
| 2014/0124292 | A1* | 5/2014 | Montgomery | A62B 35/04 |
| | | | | 182/3 |
| 2014/0251724 | A1* | 9/2014 | Nichols, Jr. | A62B 35/0068 |
| | | | | 182/3 |
| 2014/0356077 | A1* | 12/2014 | Kekahuna | F16B 13/066 |
| | | | | 405/259.4 |
| 2017/0268243 | A1* | 9/2017 | Lopez | A62B 35/0068 |
| 2017/0361135 | A1* | 12/2017 | Crookston | A62B 35/0068 |
| 2018/0117374 | A1* | 5/2018 | Pascoe | A62B 35/0068 |
| 2018/0264297 | A1* | 9/2018 | Poldmaa | A62B 35/0068 |
| 2019/0030380 | A1* | 1/2019 | Giroux | A62B 35/0068 |
| 2019/0314656 | A1* | 10/2019 | Farrell | F16F 7/123 |

FOREIGN PATENT DOCUMENTS

| | | | | |
|---|---|---|---|---|
| DE | 102017100373 | A1* | 7/2018 | E04G 21/3261 |
| EP | 2447444 | A1* | 5/2012 | E04G 21/3261 |
| EP | 3020887 | A1* | 5/2016 | A62B 35/04 |

* cited by examiner

WOOD ANCHORING DEVICE

FIELD OF INVENTION

The present invention relates to an anchoring device for attachment to wood structures, particularly roofs, for anchoring a lanyard or tether that is tied to a worker and thereby to provide fall protection for the worker.

BACKGROUND

Anchoring devices are often used in construction work to provide fall protection to the workers. A worker will arrange to be tethered or tied, usually through a lanyard connected to a harness worn by the worker, to the anchoring device. The anchoring device itself is typically anchored to the structure being constructed, and is provided as a safety precaution to minimize the distance the worker might fall from the structure.

The lanyard and harness both will also stretch to some extent in the event the worker falls and thereby absorb some energy, which will reduce the peak forces experienced by the worker as the worker reaches the end of the fall. In addition, add-on energy absorbing devices are sometimes provided, which may be coupled to any of the anchoring device, the lanyard, or the harness, to further reduce these forces.

Anchoring devices specifically for mounting to wood structures, such as roofs, are also known in the art. They are typically screwed down through a plywood sheet into the thin side of a length of nominal 2×6 or 2×8 dimensional lumber that forms part of a truss. The thin side of a 2×"Y" piece of dimensional lumber is actually only 1½ inches wide. Since the loading on the anchoring device, if a worker who is tethered to the anchoring device falls, can be in any direction, in the worst case it could be applied transverse to the thin side. In that case the threaded shafts of the screws sunk into the wood would pry against a relatively thin section of wood, typically less than ¾ inches of thickness if the screws are disposed mid-way along the 1½ side, and would therefore more readily fracture or split the wood and tear out.

SUMMARY

A wood roof anchor is disclosed herein. Generally, the anchoring device has a maximum length dimension ML, a maximum width dimension MW measured perpendicular to the dimension ML, and a maximum thickness dimension MT measured perpendicular to both dimensions ML and MW. The dimension ML may be at least twice the dimension MW, and both dimensions ML and MW may be greater than the dimension MT, in which case the dimension ML and MW defines a rectangle R having two shorter sides of dimension MW and two longer sides of dimension ML.

The anchoring device comprises a connecting ring defining a closed ring-aperture. The connecting ring may be attached to the anchoring device at a center of attachment of the connecting ring to the anchoring device that projects onto the plane of the rectangle at a point P. The point P may be used to establish a reference line passing through the point P and perpendicular to the longer sides of the rectangle. The anchoring device may further comprise at least two ties having proximal ends closest to the connecting ring, and anchoring ends farther away from the connecting ring, wherein the anchoring ends of the at least two ties project onto the rectangle at points Q, that are on one side of the reference line. At least two of the at least two ties have respective closed fastening holes at the anchoring ends thereof that are available for fastening the device to the anchorage.

At least one of the at least two ties may have a length that is substantially different from a corresponding length of at least one other of the at least two ties, the different lengths providing for responding to tensile loading by stretching differentially and thereby assisting in equalizing the forces applied to the fastening holes.

As fastened to the thin side of a 2×N piece of dimensional lumber, the at least two of the at least two ties may be on the same side of the connecting ring relative to the axis of a test tensile load applied to the connecting ring in a direction perpendicular to the elongate axis of the piece of lumber.

The connecting ring may be a D-ring.

It may be provided that, if the tensile loading is 900 pounds, at least one of the ties will remain unbroken.

It may be provided that at least one of the ties is substantially stiffer than at least one other of the ties.

There may be any number of additional ties on either side of the connecting ring.

It is contemplated that any of the optional features disclosed above, as well as any other features disclosed herein, may be provided in any embodiment in combination with any other(s) of such features to the extent that they are not mutually exclusive.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DESCRIPTION OF PREFERRED EMBODIMENTS

Figure 1:
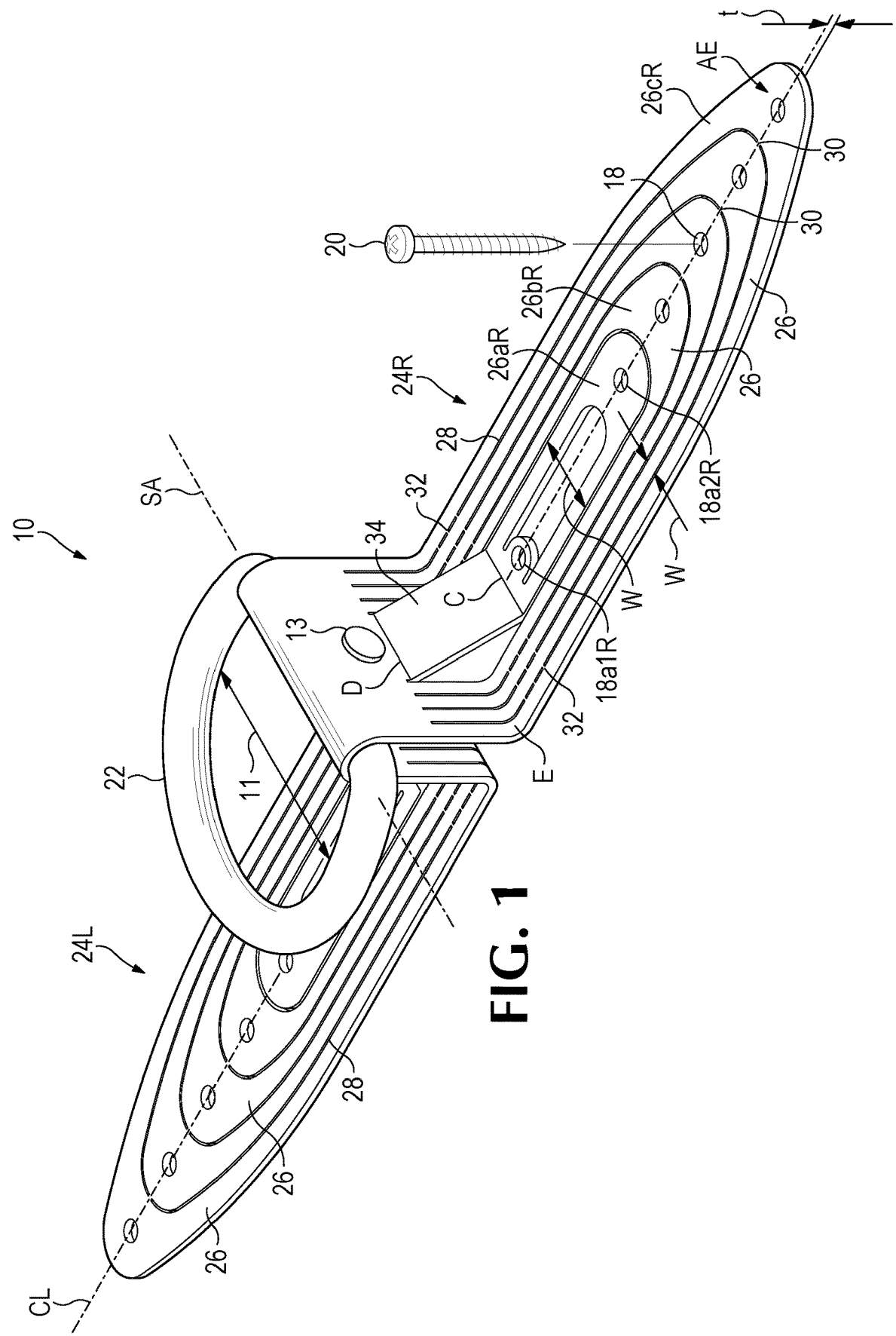
FIG. 1 is an isometric view of a sheet metal embodiment of a wood anchoring device according to the present invention.

FIG. 1 shows a preferred embodiment 10 of a wood anchoring device according to the present invention. It should be understood that, while the anchoring device 10 is intended for mounting to a wood structure such as a roof, it could be used for anchoring to other types of structures formed of other materials. However, the invention particularly addresses problems associated with anchoring to wood structures, and more particularly, wood roofs supported by trusses formed of 2×"N" dimensional lumber (where N is an even number greater than 2; e.g., 2×"N" may be 2×4, 2×6, 2×8, 2×10, 2×12, etc.).

It is often the case in wood construction that the weakest link in a fall protection system is, if not the wood itself, the connection between the anchoring device and the wood established through standard fastening hardware such as screws, bolts, and nails. For wood construction, the fastening hardware is typically either wood-screws or nails, referenced as 20 in the Figures; however, it will be understood that these are just typical examples of hardware used in the context of wood construction and that other fastening hardware could be used in the same context, or for fastening anchoring devices according to the invention to an anchorage in other contexts.

Anchoring devices according to the present invention are intended to provide for fall protection. There are standards in the art of fall protection that specify minimum load bearing requirements. These are typically specified as a static load in any direction that must be able to maintained without the device either breaking or becoming detached from the structure to which it is mounted.

However, the breaking strength that is truly needed for a given fall arrest event depends on the energy absorption properties of the anchoring device, and as noted, anchoring devices according to the present invention provide for enhanced energy absorption capacity. So while fall protection standards may specify a 5,000 pound load requirement, the breaking strength of anchoring devices according to the present invention may be as little as 900 pounds depending on the application. The minimum load, e.g., 900 pounds, at which the anchoring device should not break may be referred to as the "rated load" of the anchoring device.

The strength of a connection between an anchoring device and a wooden anchorage can of course be increased by increasing the number of fasteners. However, each additional fastener contributes less and less strength to the attachment. So one objective of the present invention is to add more strength for a given number of fasteners by distributing the load more equally to each fastener.

Figure 2:
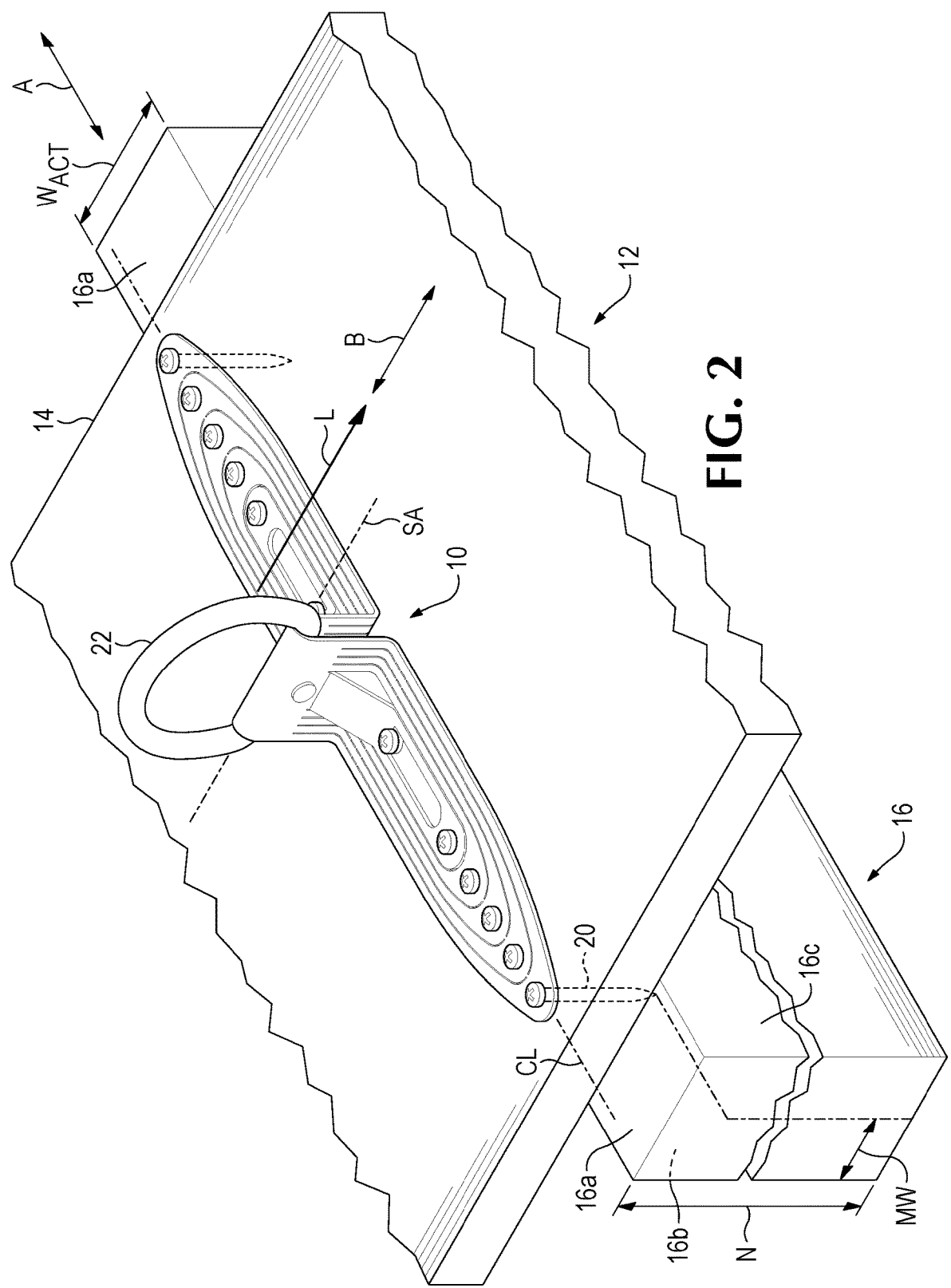
FIG. 2 is an isometric view of the wood anchoring device of FIG. 1 mounted to a wood structure.

Turning now to FIG. 2, it is also a problem in the specific context of a roof anchor that the available connection points on partially finished roofs are very limited. This often leads to a need to connect to thin sides 16a of 2×N pieces of dimensional lumber 16 such as shown, where the thin side is nominally 2 inches and is actually only 1½ inches wide (dimension "$W_{ACT}$").

FIG. 2 shows the wood anchoring device 10 in a typical mounting arrangement mounted to a wood structure 12; particularly a plywood sheet 14 overlaying the aforementioned piece of dimensional lumber 16.

With additional reference to FIG. 1, the anchoring device has fastening holes 18 for receiving the fastening hardware, the fastening hardware extending through the fastening holes 18, through the plywood sheet 14, and into the thin side 16a of the piece of dimensional lumber 16.

The grain structure of dimensional lumber typically runs along its length, parallel to axis "A," and the best case loading direction is aligned with this axis. The worst case loading direction is perpendicular to this axis, along the axis "B" as shown. This loading axis is worst case at least because, as noted previously, portions of the fastening hardware that extend into the wood would pry against a relatively thin section, and would therefore more readily fracture or split the wood and tear out.

FIG. 1 shows that the anchoring device 10 is symmetric about a centerline "CL" that is also the centerline for the fastening holes 18. This is not essential, but it is often preferable because falls are unplanned, so it often the case that the direction of loading of the anchoring device could equally well be to either side of the centerline. However, the fastening holes 18 could be offset from this center-line, or staggered in the transverse direction, parallel to axis "B" in FIG. 2, as desired, without departing from the principles of the invention.

Staying with FIG. 2, again because the direction of loading may be unpredictable, it may be preferable to align the fastening holes 18 with the side 16a so that the fasteners 20 will extend into the piece of dimensional lumber 16 mid-way along the axis "B" between side-walls 16b and 16c. That is, the centerline CL of the anchoring device 10 may be oriented so that it runs parallel to the axis A, and may be spaced centrally relative to the side 16a as the device would be viewed in plan, ¾ inches (dimension "MW" in FIGS. 2 and 3) from each of the side-walls 16b and 16c. With this provision there is an equally thick section of wood on either side of the centerline to resist fracture due to prying. Increasing the thickness on one side would of course decrease the thickness on the other.

As can be seen from FIGS. 1 and 2, the wood anchoring device 10 has a connecting ring 22 that is capable of swiveling at least 180 degrees about a swivel axis "SA" that is typically, though not necessarily, arranged to be perpendicular to the centerline CL. The connecting ring 22 defines an aperture that is "closed," meaning for purposes herein that it is surrounded by material over 360 degrees of arc (measured from a vantage point inside the aperture). Thus, a carabiner may be attached to the connecting ring 22 for tethering a worker to the anchoring device, and the carabiner cannot escape from the connecting ring 22 without the deliberate act of opening the carabiner.

It may be noted that the fastening holes 18 are also "closed" apertures. It may further be noted for future reference that these fastening holes are specific examples of "tying apertures."

A "closed" aperture is "permanently" closed when it has no provision for becoming not closed, i.e., being "opened," without breaking. Connecting rings and tying apertures described herein are preferably permanently closed, as shown.

The connecting ring 22 is shown configured as what is known in the fall protection art as a "D" ring, which is shaped like the letter "D" as shown. This is a standard form of connecting ring used in the art of fall protection. But whether configured as a "D" ring or not, the connecting ring 22 defines a connecting aperture that is circular over at least 180 degrees of arc. With specific reference to FIG. 1, this circular portion of the connecting aperture has a diameter 11 that is preferably in the range 1⅞-2½ inches; more preferably in the range 2-2⅜ inches; and most preferably 2¼ inches +/−1/16 inch, to allow sufficient space for receiving a properly sized carabiner.

Staying with FIG. 1, the connecting ring 22 is shown located and captured between two anchoring portions 24 referenced more particularly as 24R ("R" for "RIGHT") and 24L ("L" for "LEFT") portions with the understanding that which anchoring portion is RIGHT and which is LEFT is arbitrary. The two anchoring portions 24 are shown as being mirror images of one another about the swivel axis SA of the connecting ring 22, so the performance of the anchoring device will be exactly the same for forces directed toward the right of the connecting ring 22 and forces directed toward the left. But it is not essential that the two anchoring portions be mirror images of one another; and it is not even essential that there be both RIGHT and LEFT anchoring portions as will be noted further below.

The connecting ring 22 may be secured between the anchoring portions 24 by a fastening element 13 which is typically a rivet, but which may be any other type of secure fastening element(s), so that the connecting ring 22 cannot escape from the anchoring device even when the device is not mounted to a structure such as shown in FIG. 2.

Each anchoring portion has a number of "ties" 26. In this embodiment the RIGHT anchoring portion 24R has 5 ties 26R and the LEFT anchoring portion 24L has 5 ties 26L. The ties are at least partially separated from one another by, in this case, slits 28 extending through the anchoring portions. These slits can be formed in a sheet metal version of the anchoring device 10 by, for example, stamping, or die or laser cutting.

Each tie has at least one closed "tying aperture," which in this embodiment is a at least one of the fastening holes 18. In this embodiment the tying apertures are used for tying to the anchorage, but as shown further below, tying apertures can also be used for tying to other ties.

It is intended that the ties are either separated from one another when the anchoring device is not under load, or that they will become separated from one another, and the anchoring device will thereby adopt what will be referred to herein as a "deployed" configuration, when the anchoring device is anchored to an anchorage, and the connecting ring is loaded with a tensile load of 100 pounds in the worst ease loading direction. This 100 pound load will be referred to herein as the "maximum deployment load."

The fact that the ties are separate from one another allows them to stretch by different or "differential" amounts in response to a load imposed on the anchoring device by a fall. This is a highly advantageous feature of anchoring devices according to the present invention like the anchoring device 10. Allowing for differential stretching, whether elastic or plastic, of the ties to the fasteners 20 tends to equalize the load on the fasteners, whether the spacing between the holes 18 through which the fasteners extend is regular as shown or not, which avoids stress concentrations. If the ties were rigid, or if they were not able to stretch differentially, the fasteners 20 closer to the connecting ring 22 would bear a larger portion of the load than the fasteners that are farther away.

It was noted previously that one objective of the present invention is to add more strength for a given number of fasteners by distributing the load more equally to each fastener. This implies a corollary objective of providing that the tensile stresses in the ties are more balanced.

Figure 3:
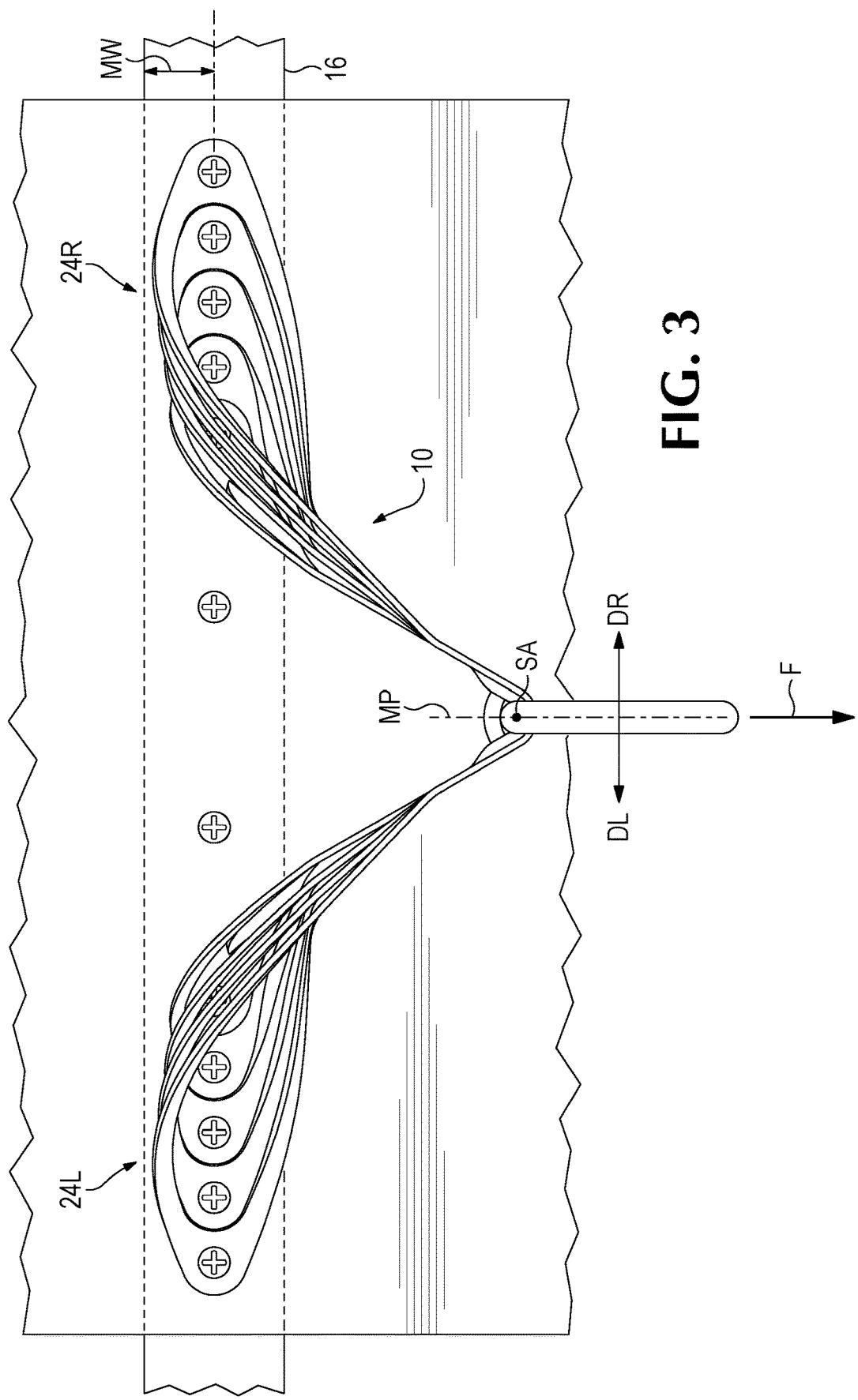
FIG. 3 is a plan view of the wood anchoring device and wood structure of FIG. 2, showing a load applied to the wood anchoring device and a corresponding deformation thereof.
Figure 4:
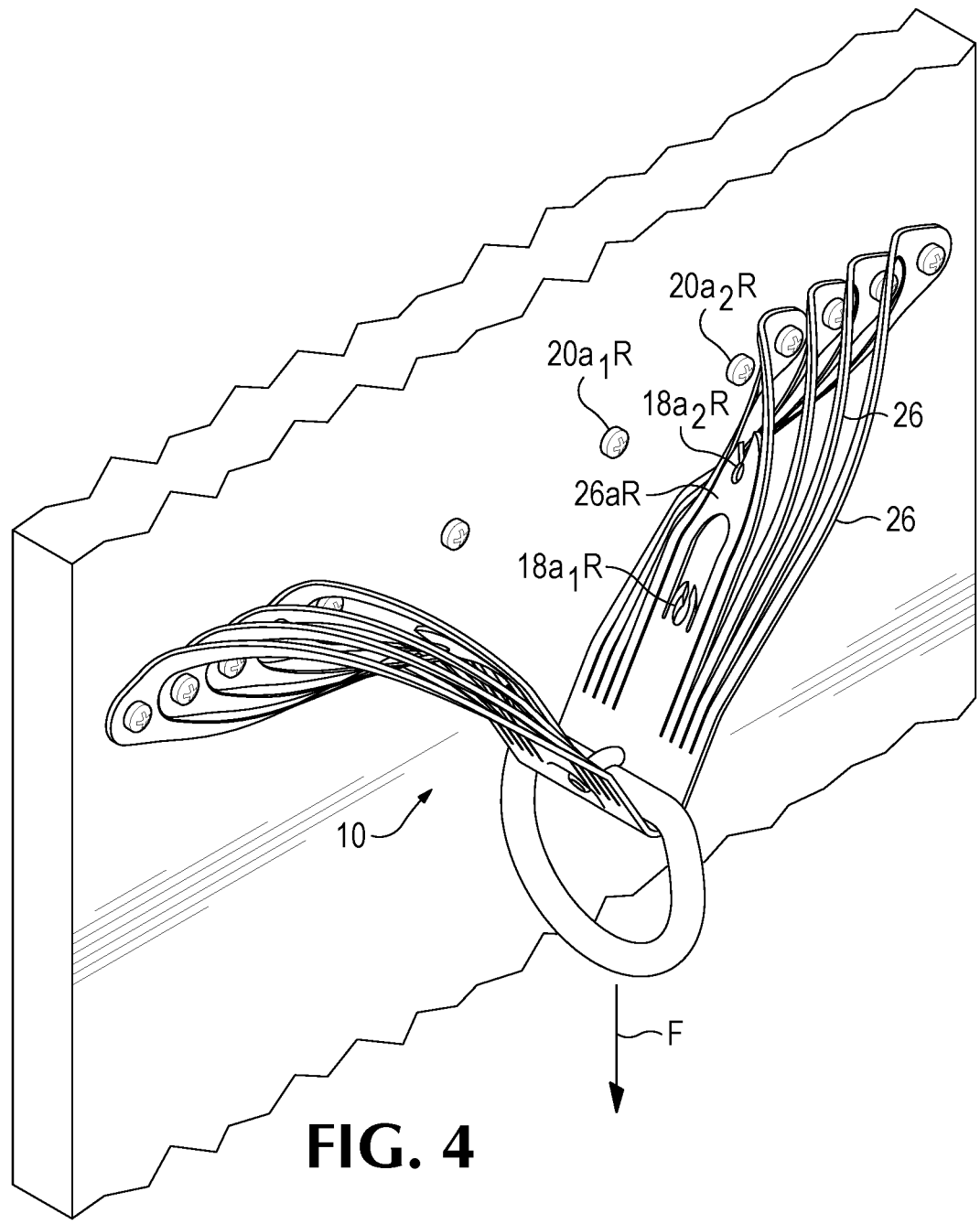
FIG. 4 is an isometric view of the deformation shown in FIG. 3.

FIG. 3 shows an example of how the ties 26 may deform and thereby "deploy" in response to a load "F" applied in the direction of the arrow. FIG. 4 shows the deformation in isometric view.

It may be noted particularly in FIG. 4 that the tie referenced as 26aR in FIG. 1 has broken loose at the fastening holes referenced as "$18a_1R$" and "$18a_2R$" from the fasteners referenced as "$20a_1R$" and "$20a_2R$", so that these fastening holes have become open. A tie such as the tie 26aR may be intentionally configured to break before the rated load is reached, for the purpose of absorbing energy, with the remaining ties configured to sustain the load. The remaining ties that have not broken at the rated load may be referred to as "active ties." The active ties in this example are all the ties that are shown unbroken ha FIG. 4.

In addition, as best seen in FIG. 3, the ties that remain tied to the anchorage that are closest to the connecting ring (e.g., the tie 26bR) are subject to greater forces than the ties that are anchored farther away (e.g., the tie 26cR) and have become stretched by greater amounts.

FIG. 3 also shows that the swivel axis SA has moved in response to the load and deformation, to become perpendicular to the load (perpendicular to the viewing plane of the Figure); whereas this axis was parallel to the same direction of loading "L" shown in FIG. 2.

Returning to FIG. 1, some additional features may be provided in anchoring devices according to the invention, to obtain some additional advantages.

First, tabs 30 may be provided between the ties to maintain a rigidity to the anchoring device 10 that is helpful for installation. These may be provided between the ends of the ties, adjacent the fastening holes 18 such as shown, or they may be provided elsewhere. These tabs are kept small so that they will easily break away when the anchoring device becomes loaded as a consequence of a fall.

Second, tabs 32 may be provided between the ties for additional energy absorption resulting from their breaking. These tabs may be provided in the location indicated, adjacent the connecting ring 22 such as shown, or they could be provided elsewhere. These tabs are small enough to ensure that the will break away when the anchoring device becomes loaded as a consequence of a fall, like the tabs 30, but they may be larger than the tabs 30 so that they will absorb a significant amount of energy as a consequence of being broken.

The tabs 30 and 32 may be provided by any desired means, such as by simply omitting to cut through the material of which the ties 26 are formed at the location of the tabs.

It may be noted in connection with the tabs that FIG. 3 shows the anchoring device in a deployed configuration, where as a consequence of the load ties that were previously connected to one another through tabs have become separated from one another by breaking the tabs as a consequence of stretching differentially.

More specifically, the tabs 30 of the sheet metal embodiment 10 must be broken to allow for any differential stretching, because the tabs 30 tie the distal or anchoring ends (e.g., the end "AE" of the tie 26cR) of the ties 26 together. But the tabs 32 are closer to the connecting ring, and therefore may allow for significant differential stretching while remaining intact. For example, if the tabs 32 were all positioned mid-way along the lengths of their respective ties, half of the length of each tie would be free to undergo differential stretching (assuming the tabs 30 have been omitted or have broken).

Preferably, the tabs 32 are positioned no further than mid-way along the lengths of the ties, to allow at least 50% of the length of a tie to undergo differential stretching with the tabs 32 remaining intact.

As a third additional feature according to the invention, the attachment to the anchoring device of the first tie, here 26*a* on the RIGHT anchoring portion 24R, and 26*b* on the LEFT anchoring portion 24L, that would deform when the anchoring device becomes loaded as a consequence of a fall, can be strengthened relative to the attachments to the anchoring device of the remaining ties, such as by provision of a gusset 34. The gusset 34 provides a transition from the plane of the tie 26*a*R at the screw-hole 18*a*$_1$R, to the plane of the attachment of the tie nearest the connecting ring 22, through two separate 45 degree angles, at locations "C" and "D," whereas the corresponding transition for the remaining ties goes through one 90 degree angle at the locations "E." The more gradual transition is inherently stiffer than the sharper one. This function could be even better provided by a gusset having a "curved" plane.

Fourth, the material thickness around the fastening holes 18 can be either reduced or increased to help control the maximum force that will be applied to any individual screw 20.

Likewise, failure of the ties can be adjusted relative to each other either by increasing or reducing their relative sizes, either thickness (the dimension "t" in FIG. 1), width (e.g., the dimension "W" in FIG. 1), or both.

Figure 5:
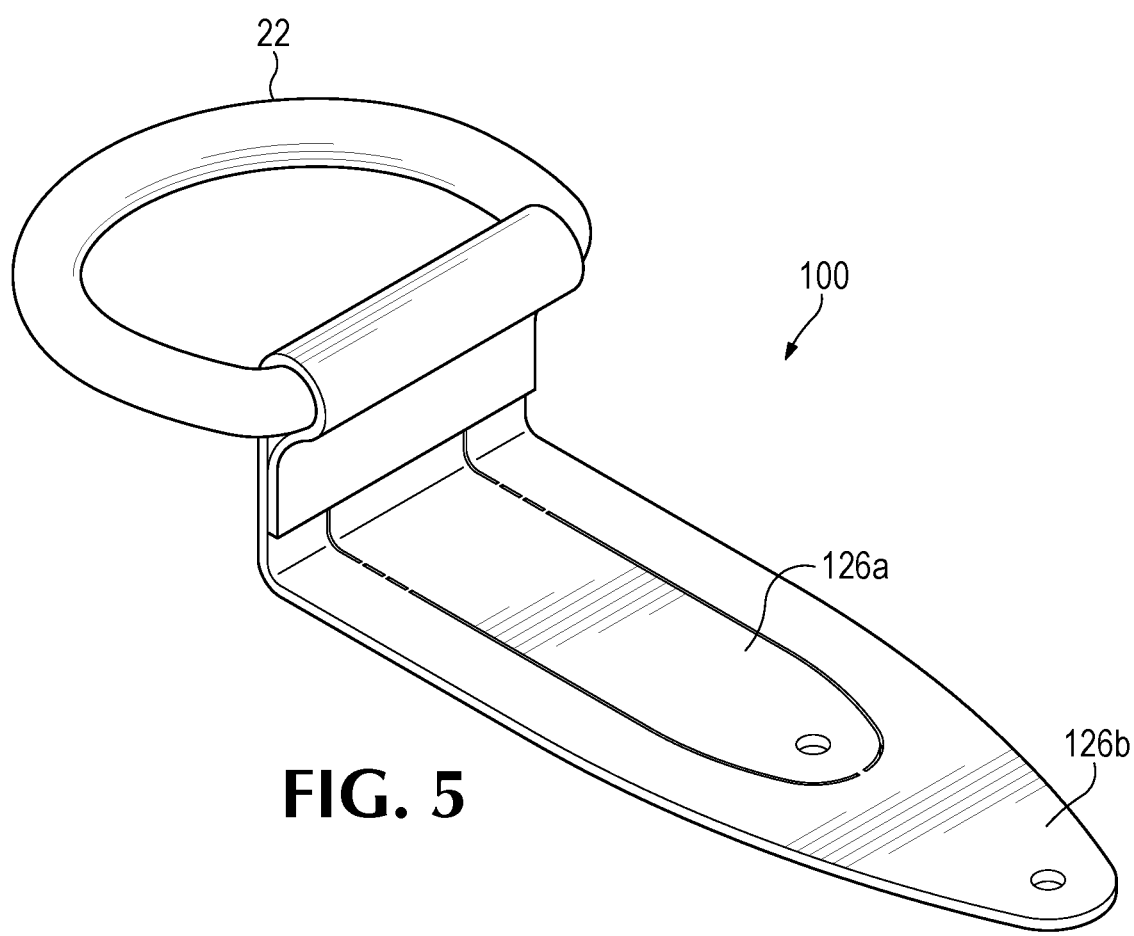
FIG. 5 is an isometric view of a simplified version of the sheet metal embodiment of FIG. 1 according to the present invention.

Turning to FIG. 5, a wood anchoring device embodiment 100 is shown that is a simplified version of the wood anchoring device 10. The anchoring device 100 may use the same connecting ring 22 as the anchoring device 10, but has only two ties 126*a* and 126*b*, both ties being on the same side, i.e., either RIGHT or LEFT, of the connecting ring.

Figure 6:
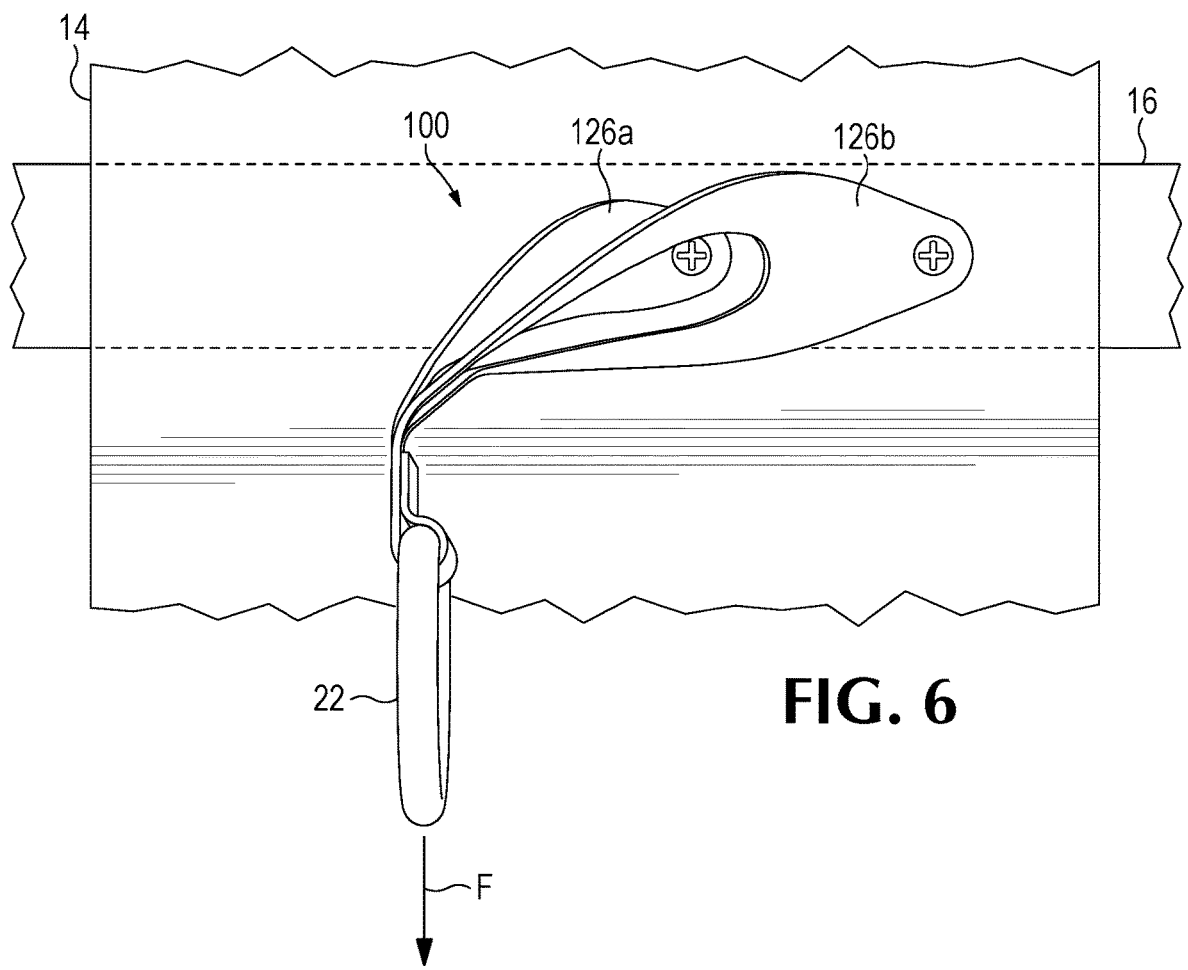
FIG. 6 is a plan view of the simplified wood anchoring device of FIG. 6 attached to a wood structure, showing a load applied to the device and a corresponding deformation thereof.

FIG. 6 shows how the anchoring device 100 will deform and thereby deploy when loaded under circumstances equivalent to those shown in FIG. 3 for the anchoring device 10.

Figure 7:
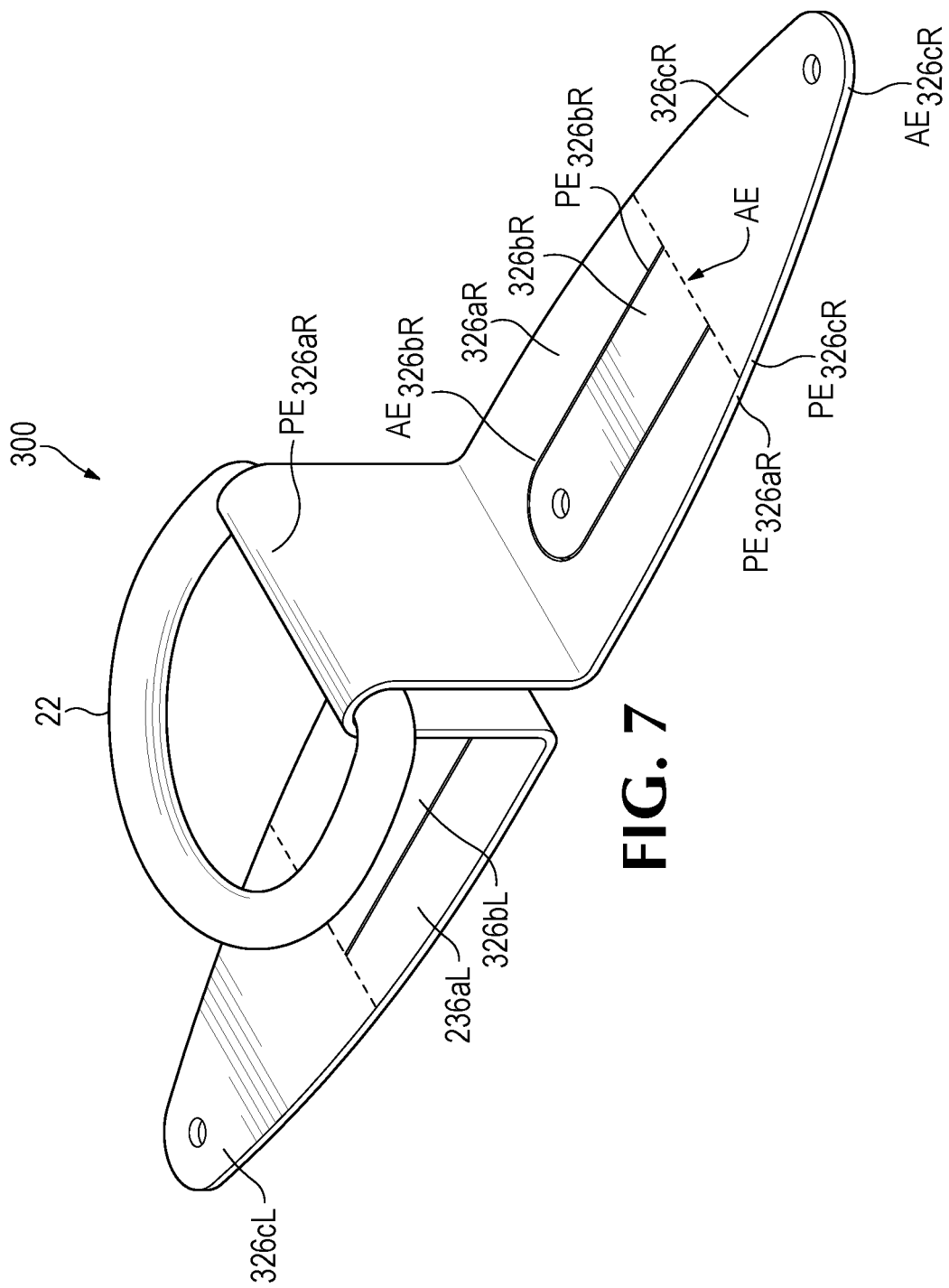
FIG. 7 is an isometric view of a tiered sheet metal embodiment of a wood anchoring device according to the invention.
Figure 8:
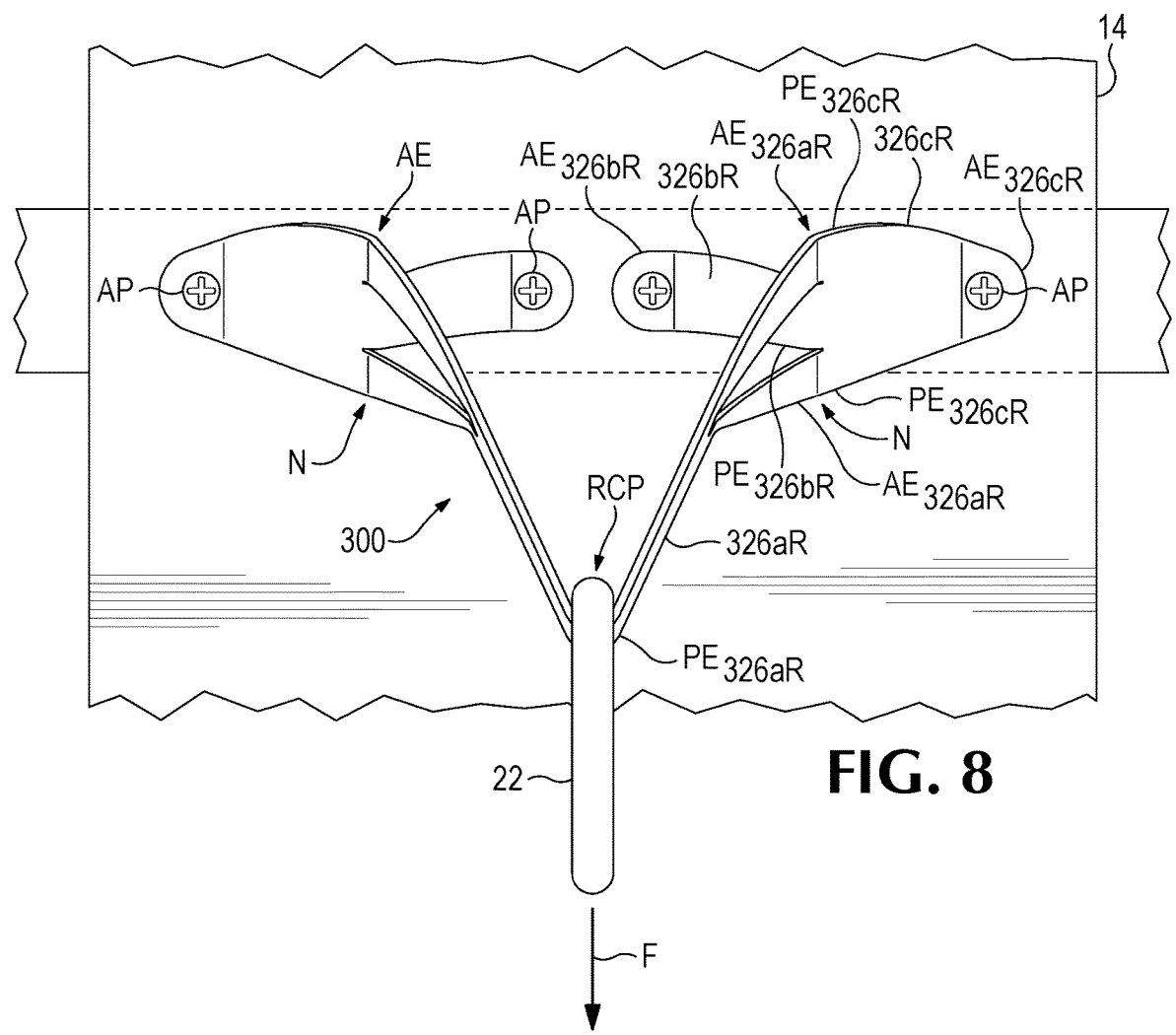
FIG. 8 is a plan view of the tiered wood anchoring device of FIG. 7 attached to a wood structure, showing a load applied to the device and a corresponding deformation thereof.

FIG. 7 shows a wood anchoring device 200 according to the invention; and FIG. 8 shows the anchoring device 200 deformed and deployed when loaded under circumstances equivalent to those shown in FIGS. 3 and 6 for the embodiments 10 and 100 respectively.

The device 200 is shown with the same connecting ring 22 described above, and has six ties 326, namely three ties 326*a*R, 326*b*R, and 326*c*R on one side of the connecting ring, and three ties 326*a*L, 326*b*L, and 326*c*L on the other side of the connecting ring.

With particular reference to FIG. 8, this embodiment illustrates a point that was not evident from the previous embodiments 10 and 100, which is that a tie may be tied to another tie, rather than directly to the anchorage, so that the anchoring device can be configured as a "tiered" or "tree-shaped" structure, defining nodes "N" that are spaced between anchor points "AP" of the anchoring device, where the anchoring device connects to the anchorage, and the ring connection point "RCP" at the ultimate connection between the connecting ring and the remaining portions of the anchoring device.

For comparison, in the embodiment 100 there are two ties in parallel; whereas in the embodiment 200 there are three ties: one tie in series with two ties in parallel, where the connection between the tie in series and the two ties in parallel defines a node. In general, there could be any number of series and parallel connection combinations of ties, and any number of nodes between ties.

Some additional notes are provided as follows:

With particular reference to FIG. 7, the tie 326*a*R has a proximal end PE$_{326aR}$ and an anchoring end AE$_{326aR}$; the tie 326*b*R has a proximal end PE$_{326bR}$ and an anchoring end AE$_{326bR}$; and the tie 326*c*R has a proximal end PE$_{326cR}$ and an anchoring end AE$_{326cR}$. For each of the two ties 326*a*R and 326*c*R, the proximal end is closer to the connecting ring 22 than the anchoring end. But this is not the case for the tie 326*b*R.

Figure 9:
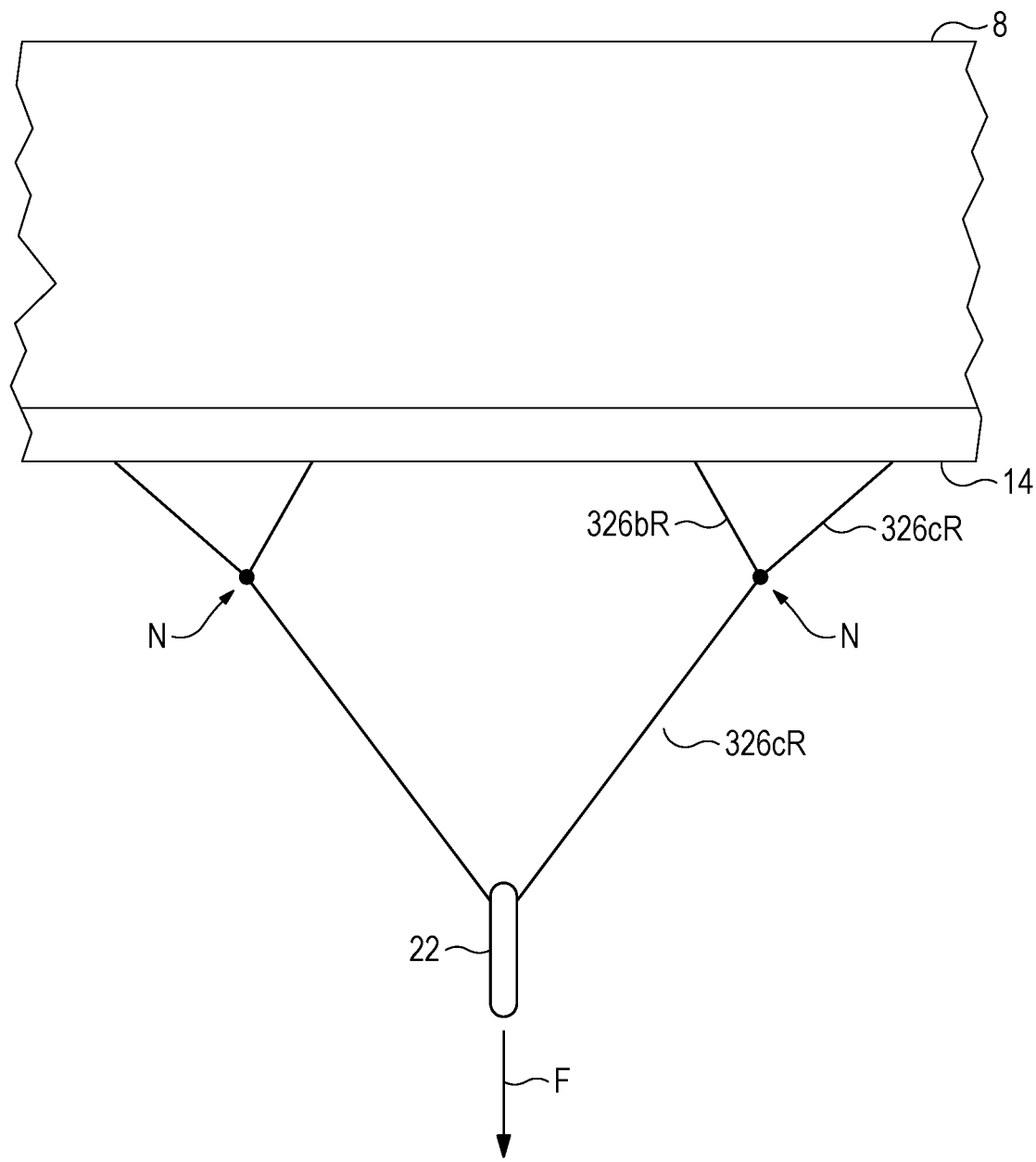
FIG. 9 is an elevation view corresponding to FIG. 8.

FIGS. 8 and 9 help to show why that is, that it is a defining property of a node N that the ties stemming from a node extend from the node at different angles, for carrying forces under load that are vectored at different angles. So if the additional tie 326*b*R were omitted in this embodiment, the two ties 326*a*R and 326*c*R would merge to become one tie, because there would no longer be a node between them. This means that in the embodiment 200 the presence of the third tie 326*b*R brings into existence two ties 326*a*R and 326*c*R on the same side of the connecting ring for which the proximal ends are closer to the connecting ring than the anchoring ends.

As noted previously, wood anchoring devices according to the invention may be formed of sheet metal, which may be advantageous from a manufacturing point of view. With such construction, the anchoring portions 24 may be flat (or nearly so) until the devices deploy. However, anchoring devices according to the invention can be formed of other materials, including non-metallic materials, such as polymeric and composite materials, and can have alternative configurations, other than those shown and described as preferred.

As shown in the Figures, the ties are typically elongate, adapted for anchoring to the thin side of a 2×"N" piece of dimensional lumber, though this is not essential.

Each tie has at least one anchoring end "AE" for anchoring either to the anchorage (see, e.g., the anchoring end AE of the tie 26*c*R in FIG. 1), or to another tie (see, e.g., the anchoring end AE of the tie 326*b*R in FIG. 8). Anchoring ends of ties intended for anchoring to the anchorage may be particularly adapted for this purpose by being provided with closed anchoring apertures such as the fastening holes 18, such anchoring aperture preferably being closed, and most preferably being permanently closed.

Figure 10:
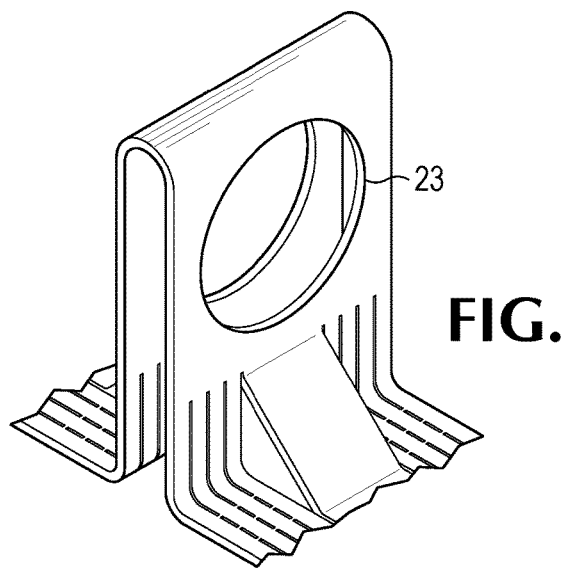
FIGS. 10-12 are isometric views of alternative connecting ring provisions for wood anchoring devices according to the invention.
Figure 11:
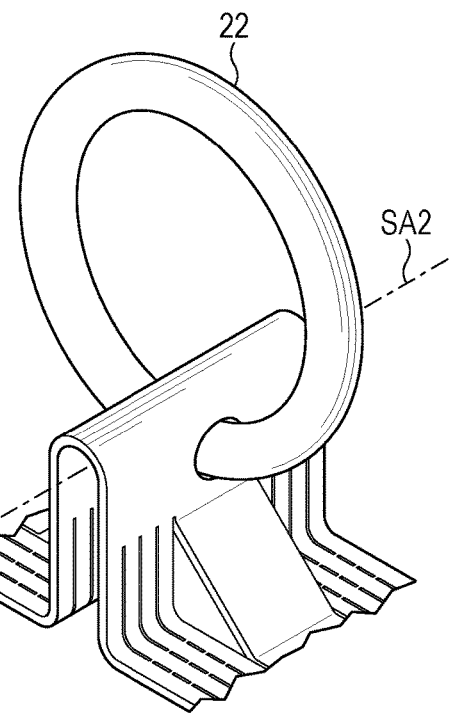
Figure 12:
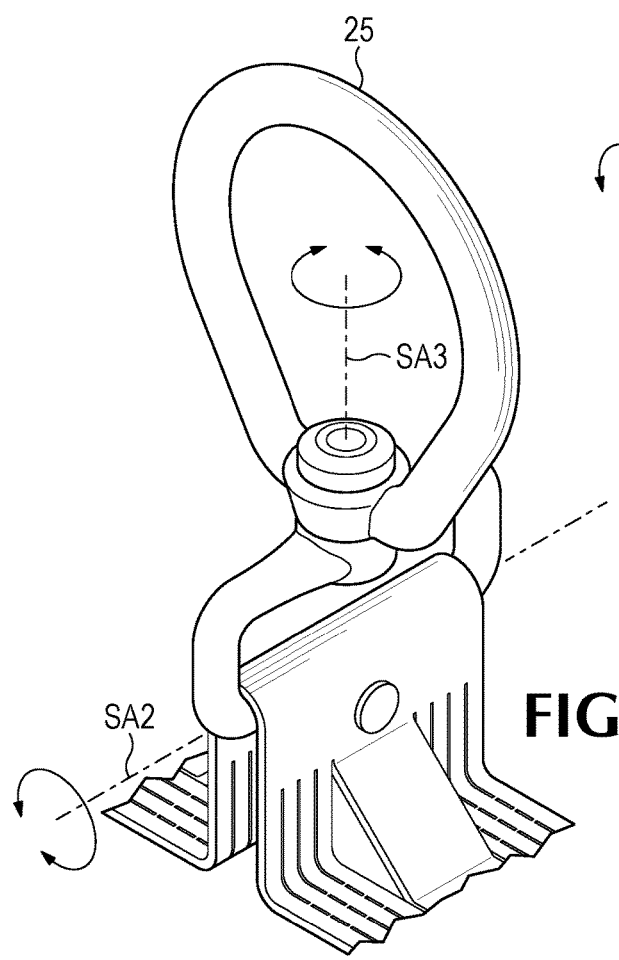

FIGS. 10-12 show alternative provisions for connecting rings for wood anchoring devices according to the invention, and alternative ways of attaching the connecting rings to the wood anchoring devices. The alternative shown in FIG. 10 is a rigidly mounted ring 23 (no swivel axis) that has a circular connecting aperture over 360 degrees of arc; the alternative shown in FIG. 11 shows the ring 22 with a swivel axis "SA2" that is perpendicular to the orientation of the swivel axis SA1 in the embodiments 10, 100, and 200; and the alternative shown in FIG. 12 has an alternative shaped ring 25 that also adds to the swivel axis SA2 another swivel axis "SA3" which is perpendicular to the swivel axis SA2.

A tie can be "connected" to a connecting ring in a number of different ways, the common feature being that the ties cannot be pulled away from the device apart from the connecting ring without being broken.

The number of ties on one side of the connecting ring can be 2, 3, 4, 5, 6, etc. without limit; in addition, the number of ties on the other side of the connecting ring can be 1, 2, 3, 4, 5, etc. without limit.

Figure 13:
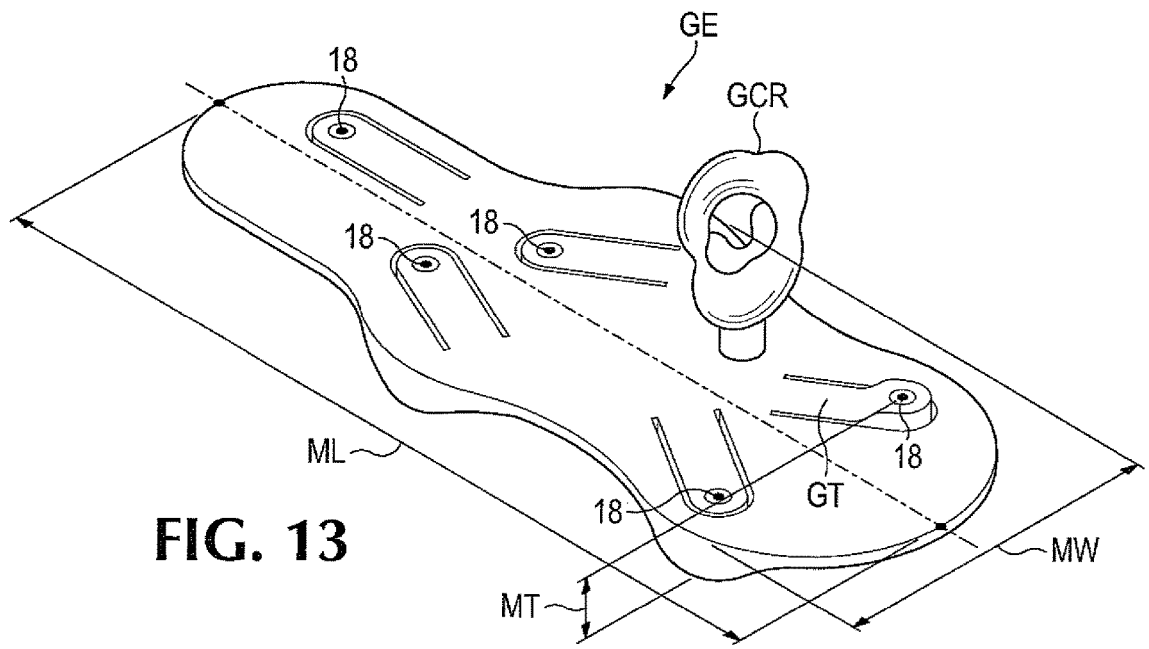
FIG. 13 is an isometric view of a generic anchoring device according to the invention, for defining terms.
Figure 14:
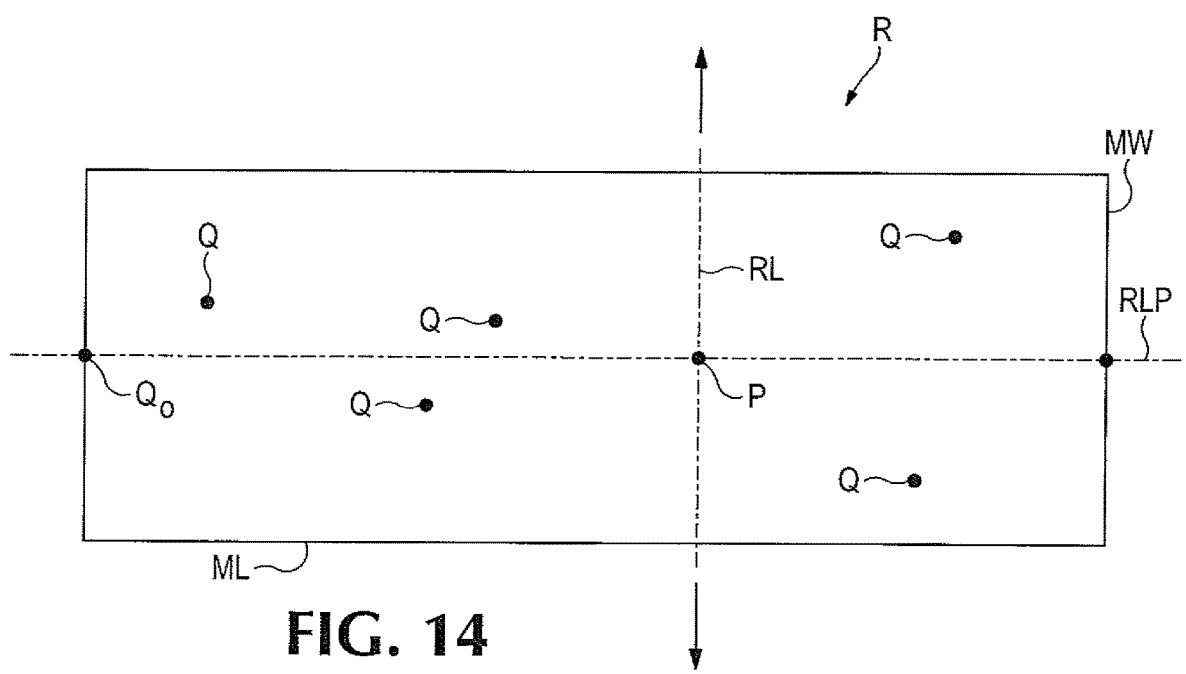
FIG. 14 is a plan view of a rectangle defined by the generic anchoring device of FIG. 13, with selected points on the generic anchoring device shown projected onto the plane of the rectangle.

The meaning of the terms "on one side of the connecting ring," or "on the same side of the connecting ring," or "on the opposite side of the connecting ring," for purposes herein may be defined with reference to FIGS. 13 and 14.

Starting with FIG. 13, a generic embodiment "GE" of a wood anchoring device is shown. The generic anchoring device GE has generic ties "GT" and a generic connecting ring "GCR." The device GE has a maximum length dimension ML, a maximum width dimension MW in directions perpendicular to the dimension ML, and a maximum thickness dimension MT in directions perpendicular to both the dimension ML and the dimension MW.

Though it is not essential, the device is preferably elongate, thus adapting it for anchoring to the thin side of a 2×"N" piece of dimensional lumber. More particularly, the dimension ML is preferably larger than the dimension MW, and more preferably significantly larger, e.g., at least 2 times larger. Also, as noted previously, though it is not essential, the device may be formed of sheet metal, in which case the dimension MT is typically smaller, and usually significantly smaller than the dimension MW, e.g., at least 2-5 times smaller.

The center of attachment of the connecting ring is for purposes herein defined to be the averaged location of the centroid (center of mass) of the connecting ring, considering all of the orientations and positions the ring is free to move.

Like-wise, the anchoring ends of the generic ties have fastening holes 18, the locations of which can be can be referenced to the same axes.

The two dimensions ML and MW define an elongate, planar "footprint" of the device, projected parallel to the dimension MT; and more particularly a rectangle "R" as shown in FIG. 14 having two longer sides of length ML, and two shorter sides of length MW.

The center of attachment of the connecting ring projects onto the plane of the rectangle as point "P," and the centers of the fastening holes 18 project onto the plane of the rectangle as points "Q." Typically, as in the embodiments 10 and 200, the projection of the center of attachment onto the plane of the rectangle R will be inside the rectangle, but this is not essential. It may be noted as a close example that in the embodiment 100 the projection of the ring center of attachment, while it would not quite be outside the corresponding rectangle R, would be centered mid-way on one of the shorter sides, at the point "$Q_0$."

A reference line "RL" can now be drawn across the rectangle R which passes through the point P and which is perpendicular to the long sides. This choice of construction for the reference line is appropriate for loading in the directions indicated by arrows, such as the loading direction shown in FIGS. 2-4, 6, and 8, which is the worst case loading direction as noted previously.

Finally, it can be concluded based on this construction of the reference line RL that there are two of the points Q on one side of the reference line, and three on the other. Likewise, the ties associated with those points, i.e., the ties having the corresponding fastening holes 18, may likewise be defined as being on one side of the reference line or the other, and therefore may be further defined as being on one side of the connecting ring or the other for purposes herein.

It may be noted that the reference line RL could have been defined differently. Most notably, it could have been defined as being the dashed line "RLP," perpendicular to the shorter sides of the rectangle R. In that case, there would still be two anchoring points AEP on one side of the connecting ring and three on the other, but they would be different sets of anchoring points than the ones identified above in connection with the reference line RL.

Using the line RLP as the reference line would be appropriate for a loading direction perpendicular to that shown by the arrows in FIG. 14 and in FIGS. 2-4, 6, and 8. But such a loading direction is considered for purposes herein unimportant for defining the reference line because it is not worst case.

If the device is not elongate, e.g., if the dimensions ML and MW are the same or similar, then the choice of the reference line RL is arbitrary, and the definition of what it means for a tie to be "on one side of the connecting ring or the other" depends on the actual direction of loading of the device.

In general, the reference line RL should be defined as parallel to the actual direction of loading. For example, when the device is mounted to the thin side of an elongate 2×N piece of lumber, a tie is either on one side or the other of the connecting ring relative to the axis of a test tensile load applied to the connecting ring in a direction perpendicular to the elongate axis of the piece of lumber (corresponding to axis A in FIG. 1) such as shown in FIGS. 2, 3, 6, and 8. For defining purposes, the test load can be small. The test load need only be large enough, e.g., 10-100 pounds, to establish a stable, defined direction of loading and point of application of the load on the ring, thereby defining a line corresponding to the reference line RL.

It is desirable for ties according to the present invention to have enhanced capability for elongation under the anticipated loads resulting from a fall, to provide for enhanced energy absorption and fall protection.

The amount of elongation any object will undergo in response to a load depends on the material properties of the material(s) of which the object is formed, and on the configuration of the object, including its size and geometry. It is also important in the context of the present invention for ties to elongate a significant percentage of the total elongation of which they are capable at the rated load for the anchoring device. So the desired elongation capabilities of the ties also depend on the number of ties in the anchoring device.

One metric for specifying the stretching or elongation capability of ties according to the invention may be referred to as "stretch percentage," which is the amount of stretch of the tie when the whole device is subject to its rated tensile load (e.g., 900 pounds), as a percentage of the total stretch that the tie can provide without breaking. A tie having a higher "stretch percentage" metric will absorb more energy. Each of the active ties should have a stretch percentage that is less than the elongation would be at breaking for that tie.

As noted previously, ties for use in any of the embodiments may advantageously be formed of sheet metal, but they could be formed of other materials and provided in other configurations. In general, they are "relatively rigid," so that, especially with assistance from the tabs 30, they are stiff enough to maintain a relatively rigid configuration that facilitates transporting and mounting the device, and that minimizes any potential for creating a tripping hazard in the ordinary course of using the device.

For purposes herein, one tie is "substantially stiffer" than another tie if it is at least 25% stiffer.

Also, as noted previously in connection with FIG. 4, a tie such as the tie 26aR in FIG. 1 may be intentionally configured to break before the rated load is reached, for the purpose of absorbing energy, like the tabs 32. In the example, the gusset 34 was provided to assist in strengthening the tie 26aR. This makes the tie 26aR relatively rigid, here so that it will break before the anchoring device reaches its rated load, leaving the remaining ties as active ties. It may be noted that the tie 26aR is also wider (see dimension "W" in FIG. 1) than the active ties, which also helps to make it relatively rigid.

Figure 15:
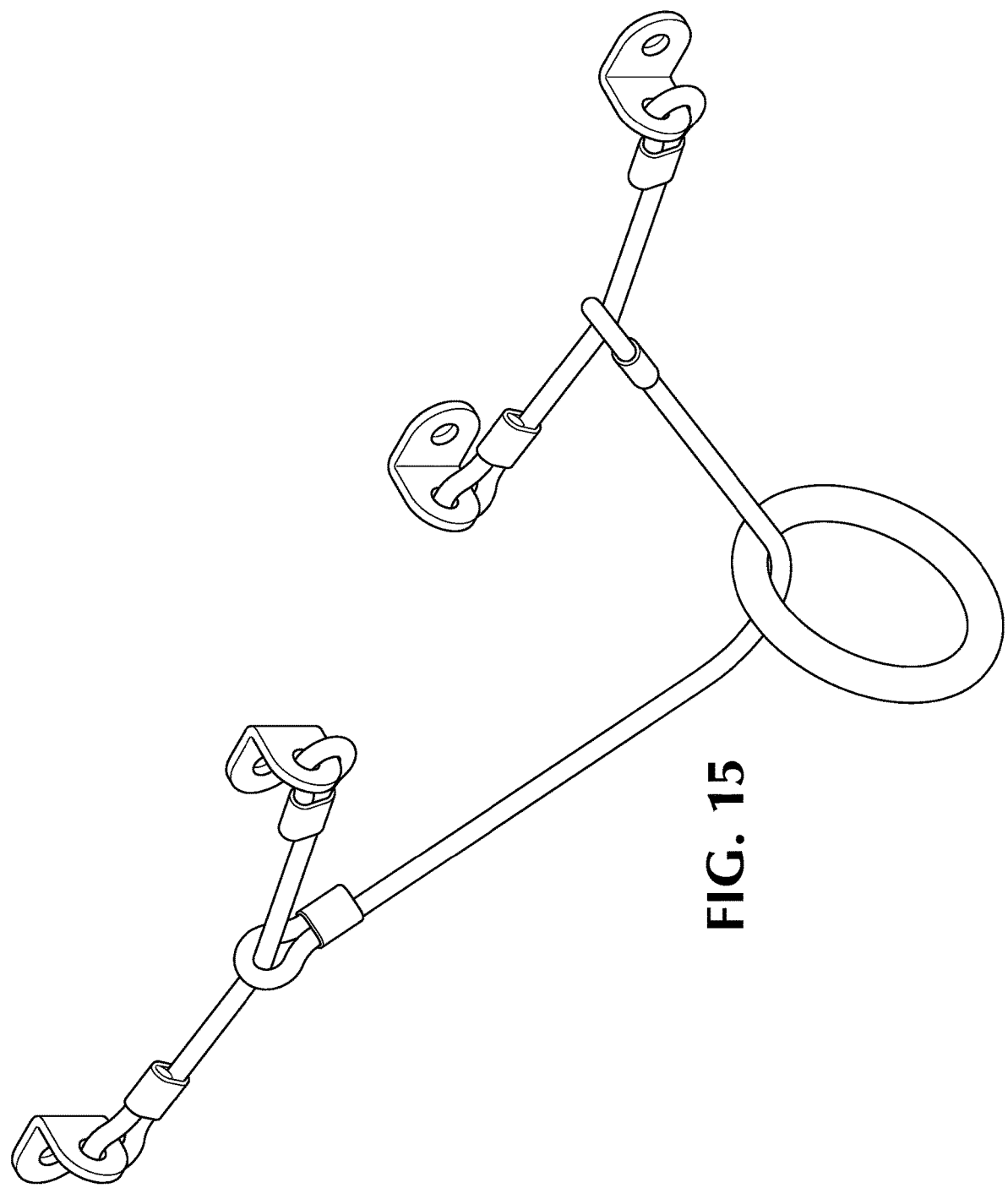
FIG. 15 is an isometric view of a tiered embodiment of a wood anchoring device according to the invention corresponding to the anchoring device of FIG. 7 employing elongate flexible members.
Figure 16:
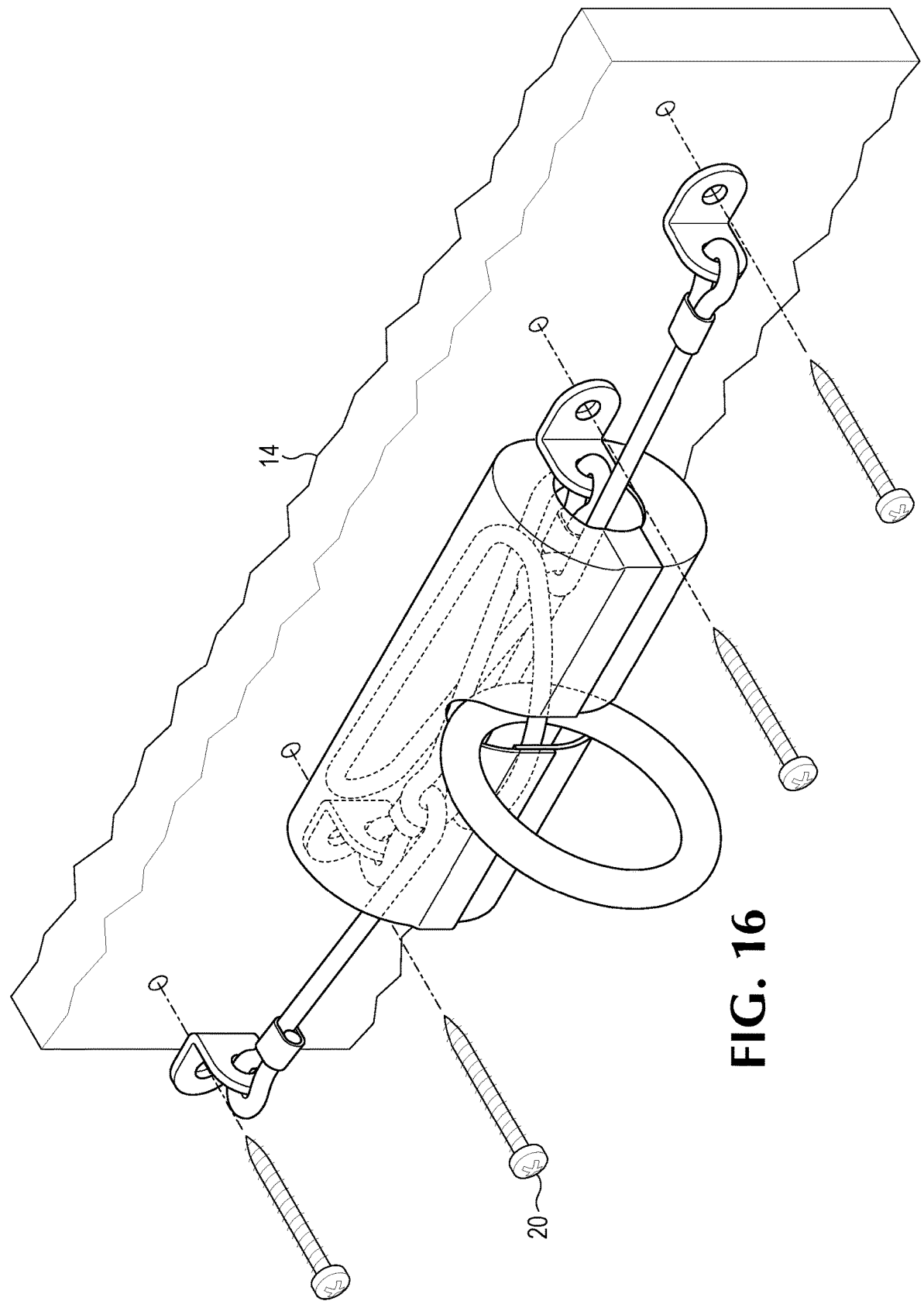
FIG. 16 is an isometric view of a packaging module according to the invention for packaging the embodiment of FIG. 15.

As an alternative to the relatively "stiff" ties described above, the ties could be "flexible," such as by being provided in the form of cables (e.g., formed of polymeric fibers or metal wires) or non-woven (e.g., solid) equivalents to cables, since they are only required to perform when loaded in tension. An example is shown in FIG. 15, corresponding to the tiered embodiment 200 of FIG. 7. To solve the problem of such ties potentially being too unwieldy or presenting a tripping hazard, they could be tied or bound together in a relatively compact form with one or more break-away bindings analogous to the tabs 30, such as by being tied or held together with one or more rings or staples; or they could be enclosed in a relatively rigid packaging module such as shown in FIG. 16 that will rupture, un-snap, or by other means open to release or deploy the ties when the connecting ring is subject to a tensile load.

Differential stretching can be provided by ensuring that the lengths of at least two of the ties on the same side of the connecting ring are substantially different from one another. For purposes herein, the length of a tie is "substantially different" from the length of another tie if the length is at least 5% different.

It is to be understood that, while specific wood anchoring devices have been shown and described as being preferred, variations may be made, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An anchoring device for anchoring to an anchorage, the anchoring device having a maximum length dimension (ML), a maximum width dimension (MW) measured perpendicular to the dimension (ML), and a maximum thickness dimension (MT) measured perpendicular to both dimensions (ML) and (MW), wherein the dimension (ML) is greater than the dimension (MW), and wherein both dimensions (ML) and (MW) are greater than the dimension (MT), the dimensions (ML) and (MW) defining a rectangle (R) having two shorter sides of dimension (MW) and two longer sides of dimension (ML), the anchoring device comprising at least one anchoring portion and a connecting ring defining a closed ring-aperture, the connecting ring being attached to the at least one anchoring portion at a center of attachment of the connecting ring to the anchoring device that projects onto the plane of the rectangle (R) at a point (P), the point (P) establishing a reference line (RL) passing through the point (P) and perpendicular to the longer sides of the rectangle (R), the anchoring portions comprising at least two ties having proximal ends closest to the connecting ring, and anchoring ends farther away from the connecting ring, wherein at least two of the at least two ties have respective closed fastening holes at the anchoring ends thereof that are available for fastening the device to the anchorage, wherein the fastening holes of the anchoring ends of the at least two ties project onto the rectangle (R) at points (Q), that are on one side of the reference line, and wherein at least one of the at least two ties has a length that is substantially different from a corresponding length of at least one other of the at least two ties, the different lengths providing for responding to a tensile loading of 900 pounds applied to the connecting ring by stretching differentially and thereby assisting in equalizing the forces applied to the fastening holes.

2. The anchoring device of claim 1, wherein the connecting ring is a D-ring and is swivelly connected to the anchoring device.

3. The anchoring device of claim 2, wherein, if the tensile loading is 900 pounds, at least one of the ties will remain unbroken.

4. The anchoring device of claim 3, wherein at least one of the ties is substantially stiffer than at least one other of the ties.

5. The anchoring device of claim 2, wherein at least one of the ties is substantially stiffer than at least one other of the ties.

6. The anchoring device of claim 2, fastened to a piece of wood through the fastening holes.

7. The anchoring device of claim 2, fastened to the thin side of a 2×N piece of dimensional lumber through the fastening holes.

8. The anchoring device of claim 1, wherein, if the tensile loading is 900 pounds, at least one of the ties will remain unbroken.

9. The anchoring device of claim 8, wherein at least one of the ties is substantially stiffer than at least one other of the ties.

10. The anchoring device of claim 1, wherein at least one of the ties is substantially stiffer than at least one other of the ties.

11. The anchoring device of claim 1, including at least one tie on the opposite side of the reference line.

12. The anchoring device of claim 11, including at least two ties on the opposite side of the reference line.

13. The anchoring device of claim 12, including at least three ties on the one side of the reference line, and at least two ties on the opposite side of the reference line.

14. The anchoring device of claim 13, wherein the connecting ring is a D-ring and is swivelly connected to the anchoring device.

15. The anchoring device of claim 14, wherein, if the tensile loading is 900 pounds, at least one of the ties will remain unbroken.

16. The anchoring device of claim 15, wherein at least one of the ties is substantially stiffer than at least one other of the ties.

17. The anchoring device of claim 14, wherein at least one of the ties is substantially stiffer than at least one other of the ties.

18. The anchoring device of claim 11, fastened to a piece of wood through the fastening holes.

19. The anchoring device of claim 11, fastened to the thin side of a 2×N piece of dimensional lumber through the fastening holes.

20. The anchoring device of claim 1, fastened to a piece of wood through the fastening holes.

21. The anchoring device of claim 1, fastened to the thin side of a 2×N piece of dimensional lumber through the fastening holes.

* * * * *